June 23, 1959 W. J. REYNOLDS 2,891,780
WEIGHING SCALE WITH SENSITIVITY ADJUSTMENT MEANS
Filed April 30, 1956
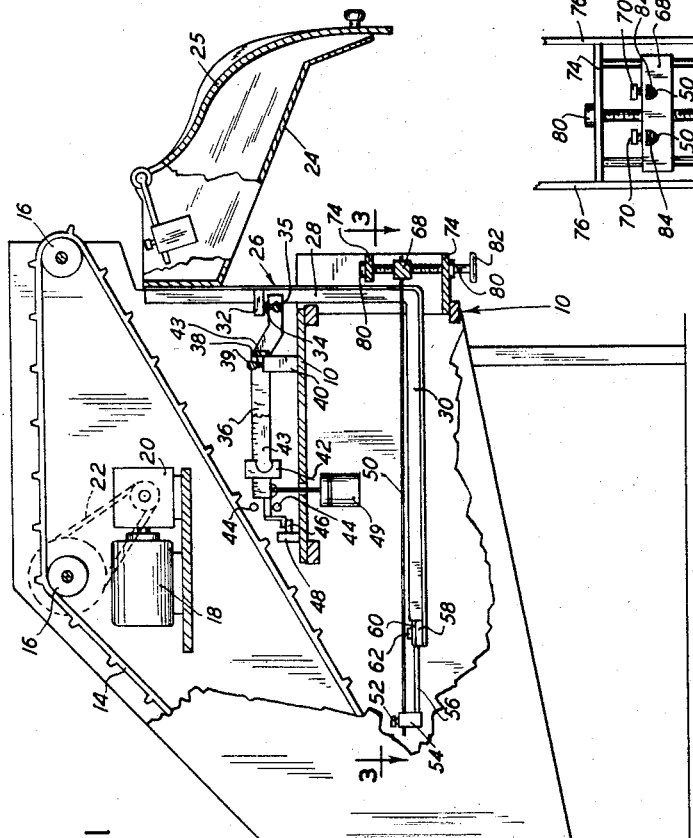
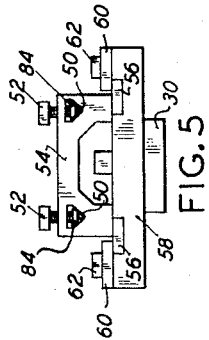
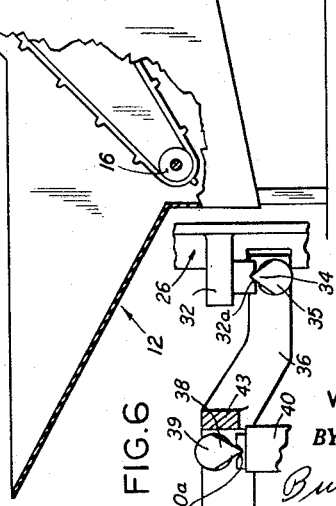
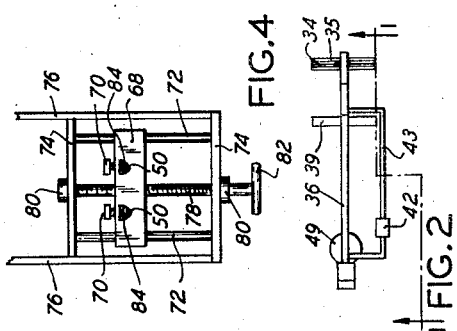
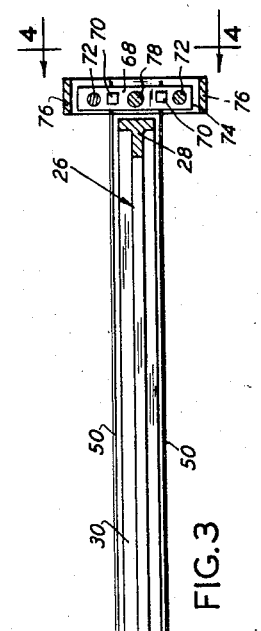
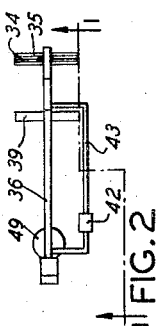
INVENTOR.
WALTER J. REYNOLDS
BY
Buckhorn and Cheatham
ATTORNEYS United States Patent Office 2,891,780
Patented June 23, 1959

2,891,780

WEIGHING SCALE WITH SENSITIVITY ADJUSTMENT MEANS

Walter J. Reynolds, Portland, Oreg., assignor, by mesne assignments, to Lynch Corporation, Anderson, Ind., a corporation of Indiana Application April 30, 1956, Serial No. 581,633

6 Claims. (Cl. 265—49)

This invention relates to a weighing mechanism and more particularly to a structure which provides for readily adjusting the sensitivity of the mechanism and also for adjusting such mechanism to substantially eliminate errors which may result from variations in the position upon the weighing member of the center of gravity of different charges of materials being weighed.

The weighing mechanism of the present invention is of simple and rugged construction and has particular utility for weighing charges in bagging or other packaging machines, but such weighing mechanism also has utility in any type of device requiring a simple, accurate and readily adjustable weighing mechanism. In such weighing mechanism a scale beam is pivotally supported upon a frame and pivotally supports a weight supporting member at a position spaced along the beam from its support on the frame. The weight supporting member has its portion which receives material to be weighed positioned on one side of its pivotal support with respect to directions longitudinal of the scale beam so that the weight of materials placed upon such portion, as well as the weight of such portion itself, tends to pivot the weight supporting member about a horizontal axis extending laterally of the scale beam through the pivotal support of the weight supporting member upon the scale beam. It has been found that one or more tension wires extending between the weight supporting member and the frame in a direction substantially parallel to the scale beam and spaced vertically therefrom, provide an effective support for the weight supporting member against such pivotal movement and, furthermore, that adjustments of the length of the wire and of the relative vertical positions of the ends of the wire can be employed to adjust the sensitivity of the weighing mechanism and increase its accuracy.

In this preferred embodiment, a pair of laterally spaced tension wires are securely clamped at their ends to the frame and to the weight supporting member so that a change in vertical height between the ends of each of the wires will flex the wires and cause them to act as spring members. By adjusting the length of the wires, for example, by moving the attaching means at one end of the wires longitudinally of the wires, the spring force of the wires can be varied and this enables the sensitivity of the weighing mechanism to be varied. That is to say, the shorter the length of the wires, the greater the change in weight on the weight supporting member required to cause the scale beam to move a given distance between its stops.

A variation in the position of a given weight of material on the weighing member of a weight supporting mechanism of the type described above may result in a variation in the position of the scale beam. That is to say, there may be a variation in the weight required to bring the scale beam to a given position of balance as the center of gravity of the material upon the weighing portion of the mechanism is moved in a direction longitudinally of the scale beam. Thus, an indicator, such as a needle, indicating the position of the beam will move when the same weight upon the weight supporting member of the mechanism is shifted from one position to another. This effect has been referred to in the art as "needle creep." By making the ends of the wires vertically adjustable with respect to each other, a position of adjustment can be found at which movement of the center of gravity of the weight upon the weight supporting member has substantially no effect upon the position of the scale beam so that needle creep is eliminated. In the preferred embodiment, the attaching means for the ends of the wires secured to the frame is made vertically adjustable and the attaching means for the ends of the wires secured to the weighing member is made horizontally adjustable along the weight supporting member so as to vary the length of the wires.

It is therefore an object of the present invention to provide an improved weighing mechanism which is of simple and rugged construction and which may be readily adjustable to vary either the sensitivity of the scale or to compensate for inaccuracy of the scale due to varying positions of the center of gravity of the material being weighed on the weighing portion of the mechanism.

Another object of the invention is to provide weighing mechanism in which a spring wire is employed as part of the support for the weighing portion of the scale and such wire is made adjustable in length to vary the sensitivity of the scale.

Another object of the invention is to provide an improved weight supporting mechanism in which a weighing member is pivotally supported upon a scale beam and restrained against tipping by spring wires in a manner enabling the sensitivity of the mechanism to be readily adjusted.

A further object of the invention is to provide a weighing mechanism having a weight supporting member retained in weighing position by spring wires and providing for adjustment of the points of attachment of the spring wires so as to eliminate inaccuracies due to varying positions of the center of gravity of material being weighed upon the weighing portion of the weighing mechanism.

Other objects and advantages of the invention will appear in the following description of a preferred embodiment shown in the attached drawings of which:

Fig. 1 is a side elevation of a bagging machine with parts broken away showing a weighing mechanism in accordance with the present invention;

Fig. 2 is a top view of a scale beam of a type suitable for employment in the present invention, Fig. 1 being taken on the line 1—1 thereof;

Fig. 3 is a fragmentary horizontal section on an enlarged scale, taken on the line 3—3 of Fig. 1;

Fig. 4 is a fragmentary end elevation on a further enlarged scale of the means for attaching the spring wires of the present invention to the frame of the machine taken in the direction indicated by the line 4—4 on Fig. 3;

Fig. 5 is a fragmentary end elevation on a still further enlarged scale, showing the means for attaching the spring wires of the present invention to the weighing member, and Fig. 6 is a fragmentary side elevation, partly in cross section, of a portion of Fig. 1, showing details of the knife edge support and pivotal mounting of the scale beam.

Referring more particularly to the drawings, the weighing mechanism of the present invention is shown as being incorporated in a bagging machine having a frame 10, a supply hopper 12 suitable for such materials as apples or potatoes, and an endless conveyor 14 mounted on pulleys or drums 16, one of which is driven from a motor 18 through a speed reducing mechanism 20 and a belt drive 22. The conveyor delivers material to be weighed into a weighing bucket or scoop 24 forming part of the weighing mechanism of the present invention and having a manually operable gate 25. The bucket 24 forms part of a weight supporting or weighing member 26 which has a vertically extending portion 28, the bucket 24 being secured to the upper end of such vertically extending portion. The weight supporting member also has a portion 30 extending horizontally from the lower end of the vertical portion 28 in a direction away from the bucket 24. The vertically extending portion 28 is provided intermediate its vertical height with a laterally extending member 32 having grooves 32ª shown in Fig. 6 for receiving upwardly directed knife edges 34 on a cross member 35 at the end of a scale beam 36, the scale beam 36 also having downwardly directed knife edges 38 on a cross member 39 intermediate the ends of the beam, the knife edge engaging grooves 40ª shown in Fig. 6 in a support member 40 carried by the frame 10 of the machine. The scale beam 36 has a weight 42 adjustably carried on a scale 43 secured to the beam and can pivot about the knife edges 38 between stops 44. The end of the scale beam 36 opposite the knife edge 35 also carries a switch actuating means, shown as being a small permanent magnet 46 positioned adjacent a magnetically operated switch 48 mounted on the frame of the machine. The tare weight on the beam is counterbalanced by a weight 49 depending from the beam. The switch 48 may be a commercially obtainable switch having an armature and contacts positioned within a sealed envelope. When the scale makes its weight, the magnet 46 is moved upwardly to actuate the switch 48 and stop the motor 18 driving the conveyor 14. It will be apparent that other types of switches requiring a small operating force may be employed.

The weight supporting member 26 pivots about the knife edges 34 and, since the weight in the scoop 24 is displaced horizontally from the knife edges 34 in a direction extending longitudinally of the scale beam, the weighing member 28 must have an auxiliary support to prevent tipping about the knife edges 34. In accordance with the present invention, a pair of spring wires 50 are horizontally adjustably secured to the end of the horizontal portion 30 of the weight supporting member 26 opposite the vertical portion 28, and the other ends of the wires are vertically adjustably secured to the frame 10. Thus, one end of each of the wires 50 is clamped by means of the set screw 52 in a cross member 54 having laterally spaced support rods 56. The support rods are positioned in slots in a laterally extending crosspiece 58 on the end of the horizontally extending portion 30 of the weight supporting member 26. The rods 56 are clamped in position by clamping members 62 and clamp screws 62. By loosening the screws 52 and 62, the rods 56 can be moved longitudinally of the lower member 30 of the weight supporting member 26 to shorten on lengthen the effective lengths of the wires 50. The arrangement is such that the cross member 54 can occupy a position immediately above the cross member 58, since the length of the cross member 54 is less than the distance between the clamping members 60, and also the wire holding structure including the cross member 54 and the rods 56 can be reversed so that the cross member 54 can also occupy a position to the right of the cross member 58 in Fig. 3, thus providing a substantial range of adjustment of the length of the wires 50. Weight may be added to or removed from the weight 49 to compensate for movement of the cross member 54 and associated rods 56 to adjust the lengths of the wires 50.

The other ends of the wires 50 are received in a cross member 68 and are clamped in position therein by set screws 70. The cross member 68 may be adjusted vertically and is mounted upon a pair of vertically extending rods 72 secured at their tops and bottoms in cross members 74, which are in turn secured at their ends to members 76 forming part of the frame 10. The cross member 68 has vertically extending bores receiving the guide rod 72 and may be moved vertically upon the guide rods by a screw-threaded member 78 extending through bores in the cross members 74 and held against vertical movement by collars 80. The member 78 is received in a screw-threaded bore in the cross member 68 so that rotation of the member 78 by a knob or handwheel 82 causes vertical movement of the cross member 68. The wires 50 are preferably clamped rigidly in the cross members 54 and 68, for example, by clamping members 84 bearing on the tops of the ends of the wires and pressing them downwardly into V-shaped notches, the clamping members 84 being pressed downwardly by the clamping screws 52 or 70.

It will be apparent that the wires 50 form part of the support for the weighing member 26, including the weight supporting bucket 24. The wires are made of spring material and function as spring members controlling vertical movement of the weight supporting member 26 with respect to the cross member 68. The spring force of the wires 50 can be adjusted by adjusting their effective length, this adjustment being effected by moving the cross member 54 relative to the end of the lower portion 30 of the weight supporting member 26. The force required to move the scale beam from its lower stop to a balanced position between the stops can thus be varied to vary the sensitivity of the scale.

In the type of weighing device illustrated, the weight on the weight supporting member 26 does not always have its center of gravity in the same position in the bucket 24 or other weight receiving structure. Movement of such center of gravity in a direction longitudinally of the scale beam 36 will vary the amount of weight required to bring the scale to a balanced position between the stops 44. Stated differently, the same weight to be weighed when moved to different positions in the bucket 24 may cause the beam 36 to assume different positions between the stops 44. This effect has been referred to in the art as "needle creep" from the fact that an indicating needle attached to the scale beam 36, either directly or through a motion amplifying means, will creep or change position as the position of the weight relative to the weight supporting member 26 is shifted. It has been found that this effect may be substantially eliminated by raising or lowering one end of the wires 50 relative to the other end thereof, and thereby toward and away from the scale beam 36. That is to say, a vertical position of the cross member 68, for each adjusted length of the wires 50 between the cross members 54 and 68, can be found which will substantially completely eliminate needle creep.

The operation of the bagging machine disclosed is believed apparent from the above description. Material to be weighed in bulk, such as apples or potatoes, is deposited in the hopper 10. The endless conveyor 14 driven by the motor 18 through the speed reducer 20 and belt drive 22 elevates such material and deposits it in the weighing bucket 24. When the weighing mechanism makes its weight as determined by the position of the weight 42 on the scale beam, the small permanent magnet 46 actuates the switch 48 to stop the conveyor 14. Ordinarily, the operator will then adjust the weight in the bucket 24 by adding or removing one or more of the articles being weighed and will then manually dump the contents of the bucket 24 into a bag held below the bucket by lifting the hinged gate 25. The operator will then again start the machine by a manually operable switch (not shown) and the machine will run until the weighing mechanism again makes its weight. The sensitivity of the weighing mechanism, namely, the difference in weight which is required to move the scale from its position against the lower stop 44 to its balanced position, may be varied by adjusting the length of the wires 50 by sliding the cross member 54 longitudinally of the lower portion 30 of the weight supporting member 26, it being understood that the clamping screws 52 and 62 will be loosened and then tightened. After thus adjusting the lengths of the wires 50 for a desired sensitivity, it may be necessary to make an adjustment of the height of the end of the wires 50 connected to the frame to eliminate "needle creep." This can be done by placing an appropriate weight in the bucket 24, moving it in a direction longitudinally of the beam 36 while correcting for any change of position of the beam 36 by turning the screw-threaded member 78 with the knob 82 to raise or lower the cross member 68.

While I have disclosed the preferred embodiment of my invention, it is to be understood that the details may be varied and that the invention is to be limited only by the scope of the following claims.

I claim:

1. A weighing mechanism comprising a frame, a scale beam, a first pivotal supporting means for supporting said beam on said frame intermediate the end of said beam, a weight supporting member, a second pivotal supporting means for pivotally supporting said weight supporting member on said beam at a position spaced along said beam from said first pivotal supporting means, said weight supporting member having a weight receiving portion positioned on one side of said second pivotal support with respect to a direction longitudinal of said beam so as to tend to cause tipping of said weight supporting member about said second pivotal support, a tension wire extending between said weight supporting member and said frame in a direction generally parallel to said beam and at a position spaced in a vertical direction from said beam, clamping means for clamping the ends of said wire to said weight supporting member and said frame to hold said weight supporting member in weighing position, means providing for movement of one of said clamping means toward and away from each other to adjust the sensitivity of said weight supporting mechanism, and means providing for movement of one of said clamping means relative to the other in a vertical direction toward and away from said beam.

2. A weighing mechanism comprising a frame, a scale beam, a first pivotal supporting means for supporting said beam on said frame intermediate the end of said beam, a weight supporting member, a second pivotal supporting means for pivotally supporting said weight supporting member on said beam at a position spaced along said beam from said first pivotal supporting means, said weight supporting member having a weight receiving portion positioned on one side of said second pivotal support with respect to a direction longitudinal of said beam so as to tend to cause tipping of said weight supporting member about said second pivotal support, a tension wire extending between said weight supporting member and said frame in a direction generally parallel to said beam and at a position spaced in a vertical direction from said beam, clamping means for clamping the ends of said wire to said weight supporting member and frame to hold said weight supporting member in weighing position, and means providing for movement of one of said clamping means relative to the other in a vertical direction toward and away from said beam.

3. A weighing mechanism comprising a frame, a scale beam, a first pivotal supporting means for supporting said beam on said frame intermediate the end of said beam, a weight supporting member, a second pivotal supporting means for pivotally supporting said weight supporting member on said beam at a position spaced along said beam from said first pivotal supporting means, said weight supporting member having a weight receiving portion positioned on one side of said second pivotal support with respect to a direction longitudinal of said beam so as to tend to cause tipping of said weight suporting member about said second pivotal support, a tension wire extending between said weight supporting member and said frame in a direction generally parallel to said beam and at a position spaced in a vertical direction from said beam, clamping means operative to secure said wire to said weight supporting member and frame to hold said weight supporting member in weighing position, and means providing for movement of one end of said wire relative to the other in a vertical direction toward and away from said beam.

4. A weighing mechanism comprising a scale beam, a frame for said mechanism, a first supporting means for pivotally supporting said beam on said frame intermediate the ends of said beam, a weight supporting member, second supporting means for pivotally supporting said weight supporting member on said beam at a position spaced along said beam from said first supporting means, said weight supporting member having a portion for receiving material to be weighed positioned on one side of said second supporting means in a direction longitudinal of said beam so as to tend to cause tipping of said weight supporting member about said second supporting means, a pair of laterally spaced tension wires extending between said weight supporting member and said frame in a direction generally parallel to said beam and at a position spaced in a vertical direction from said beam, clamping means for clamping the end of said wires to said weight supporting member and said frame to hold said weight supporting member in weighing position, means for adjusting the effective lengths of said wires to adjust the sensitivity of said weighing mechanism, and means for adjusting the vertical position of the point of attachment of one end of said wires with respect to the vertical position of the point of attachment of the other end of said wires to compensate for varying positions of said material upon said weight supporting member.

5. A weighing mechanism comprising a scale beam, a frame for said mechanism, a first supporting means for pivotally supporting said beam on said frame intermediate the ends of said beam, a weight supporting member, second supporting means for pivotally supporting said weight supporting member on said beam at a position spaced along said beam from said first supporting means, said weight supporting member having a portion for receiving material to be weighed positioned on one side of said second supporting means in a direction longitudinal of said beam so as to tend to cause tipping of said weight supporting member about said second supporting means, a pair of laterally spaced tension wires extending between said weight supporting member and said frame in a direction generally parallel to said beam and at a position spaced in a vertical direction from said beam, clamping means for clamping the ends of said wires to said weight supporting member and said frame to hold said weight supporting member in weighing position, means for adjusting the clamping means for one end of said wires along said wires to adjust the sensitivity of said weighing mechanism and means for adjusting the vertical position of the clamping means for one end of said wires with respect to the vertical position of the clamping means for the other end of said wires to compensate for varying positions of said material upon said weight supporting member.

6. A weighing mechanism comprising a scale beam, a frame for said mechanism, a first supporting means for pivotally supporting said beam on said frame intermediate the ends of said beam, a weight supporting member, second supporting means for pivotally supporting said weight supporting member on said beam at a position spaced along said beam from said first supporting means, said weight supporting member having a portion for receiving material to be weighed positioned on one side of said second supporting means in one direction longitudinally of said beam so as to tend to cause tipping of said weight supporting member about said second supporting means and having a lower portion extending in the other direction longitudinally of said beam and below said beam, a pair of tension wires extending between the end of said lower portion of said weight supporting member and said frame in a direction generally parallel to said beam and at a position below and spaced from said beam, clamping means for clamping the ends of said wires to said lower portion and to said frame to hold said weight supporting member in weighing position, means for adjusting said clamping means for clamping the ends of said wires to said lower portion along said wires to adjust the sensitivity of said weighing mechanism and means for adjusting the vertical position of the clamping means for clamping the ends of said wires to said frame to compensate for varying positions of said material upon said weight supporting member.

References Cited in the file of this patent

UNITED STATES PATENTS

| | | |
|---|---|---|
| 370,171 | Wickey | Sept. 20, 1887 |
| 1,424,239 | Conti | Aug. 1, 1922 |
| 2,702,187 | Fontaine | Feb. 15, 1955 |